United States Patent

Laaser

(10) Patent No.: US 8,532,391 B2
(45) Date of Patent: Sep. 10, 2013

(54) RECOGNIZING A FEATURE OF AN IMAGE INDEPENDENTLY OF THE ORIENTATION OR SCALE OF THE IMAGE

(75) Inventor: William T. Laaser, Palo Alto, CA (US)

(73) Assignee: Intuit Inc., Mountain View, CA (US)

(*) Notice: Subject to any disclaimer, the term of this patent is extended or adjusted under 35 U.S.C. 154(b) by 441 days.

(21) Appl. No.: 12/895,175

(22) Filed: Sep. 30, 2010

(65) Prior Publication Data

US 2012/0082377 A1    Apr. 5, 2012

(51) Int. Cl.
  *G06K 9/62*    (2006.01)

(52) U.S. Cl.
  USPC ........................................... 382/190

(58) Field of Classification Search
  None
  See application file for complete search history.

(56) References Cited

U.S. PATENT DOCUMENTS

2010/0215257 A1*   8/2010  Dariush et al. ............. 382/159
2010/0296700 A1*  11/2010  Walter et al. ............... 382/103

FOREIGN PATENT DOCUMENTS

| JP | 2006061581 A | 4/2006 |
| KR | 100586382 B1 | 6/2006 |
| KR | 100855631 B1 | 9/2009 |

OTHER PUBLICATIONS

Fergus et al., Object Class Recognition by Unsupervised Scale-Invariant Learning, Proceedings of Computer Vision and pattern Recognition, Jun. 2003, 8 pages.*
Ke et al., PCA—IFT: A More Distinctive Representation for Local Image Descriptors; Research at Intel, IRP-TR-03-15, Nov. 2003, 10 pages.*
Deepu et al., Principal Component Analysis for Online Handwritten Character Recognition, Proceedings of the 17th International Conference on Pattern Recognition, 2001, 4 pages.*

* cited by examiner

*Primary Examiner* — Brian P Werner
(74) *Attorney, Agent, or Firm* — Park, Vaughan, Fleming & Dowler, LLP

(57) ABSTRACT

One embodiment of the present invention provides a system for recognizing a feature of an image independently of the orientation or scale of the image. During operation, the system receives an image. Next, the system identifies a feature within the image. The system then performs a principal component analysis (PCA) operation on the feature to determine an orientation of a primary component of the feature and a secondary component of the feature, wherein the PCA operation is performed while source data for the image is retained. Finally, the system recognizes the feature by analyzing the primary component of the feature and the secondary component of the feature.

23 Claims, 4 Drawing Sheets

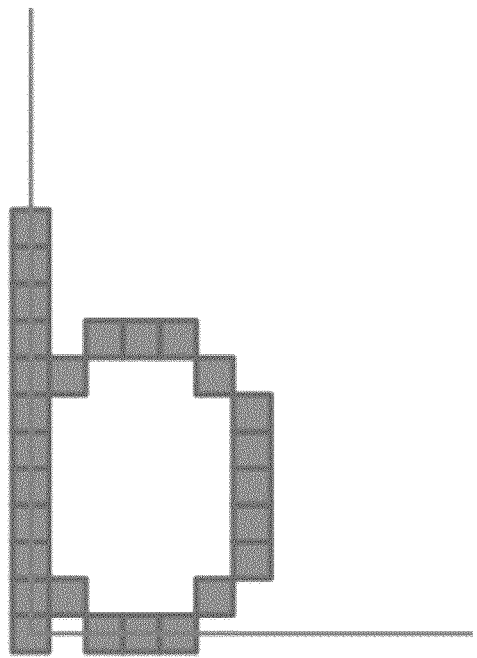
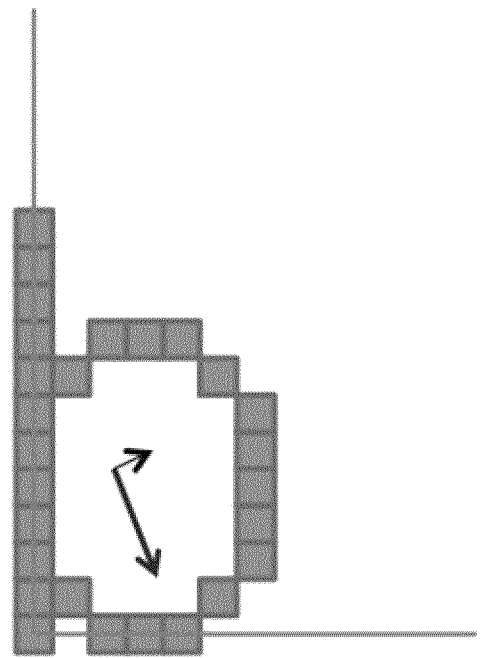
FIG. 3A  FIG. 3B
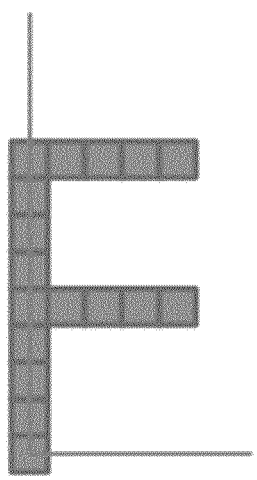
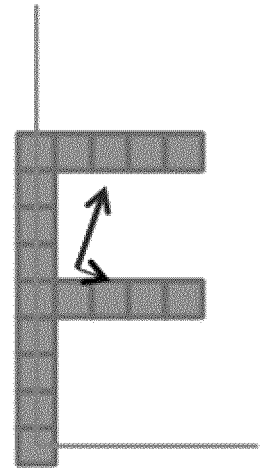
FIG. 3C  FIG. 3D

RECOGNIZING A FEATURE OF AN IMAGE INDEPENDENTLY OF THE ORIENTATION OR SCALE OF THE IMAGE

BACKGROUND

Related Art

It is often useful to be able to quickly and efficiently recognize objects in images. Object recognition techniques range from face detection to identify individuals in pictures to optical character recognition (OCR) to identify text in scanned documents.

A large number of different systems have been developed to recognize objects in images. However, typical image recognition systems (specifically, systems designed for OCR) have limited capability to adjust for resolution and orientation of an image. More specifically, existing OCR systems typically only work at a fixed resolution, for example 300 dpi. Additionally, image skewing is typically detected by analyzing linear features in the image. As a result, image recognition systems have difficulty recognizing features with arbitrary scale and orientation. Furthermore, image recognition systems are particularly bad at dealing with images that are rotated in three dimensions (wherein part of the image is further from the viewer than other parts of the image).

Another drawback to many image recognition systems is that they are configured to work with binary images. This means that interesting features of non-binary images are typically eliminated before the recognition process starts. Consequently, OCR vendors currently compete on how well their binary-conversion engine works, rather than focusing on using all the data available in the images.

SUMMARY

One embodiment of the present invention provides a system for recognizing a feature of an image independently of the orientation or scale of the image. During operation, the system receives an image. Next, the system identifies a feature within the image. The system then performs a principal component analysis (PCA) operation on the feature to determine an orientation of a primary component of the feature and a secondary component of the feature, wherein the PCA operation is performed while source data for the image is retained. Finally, the system recognizes the feature by analyzing the primary component of the feature and the secondary component of the feature.

In some embodiments of the present invention, prior to recognizing the feature, the system normalizes the feature by rotating the feature with respect to the primary component of the feature to place the feature in a canonical form.

In some embodiments of the present invention, the system normalizes the feature by computing a bounding box around the feature and compressing the feature until the bounding box has a normalized width.

In some embodiments of the present invention, the system normalizes the feature by computing a bounding box around the feature and expanding the feature until the bounding box has a normalized width.

In some embodiments of the present invention, recognizing the feature further involves dividing the feature into two or more sub-features. Next, the system selects a given sub-feature from the two or more sub-features. The system then performs a PCA operation on the given sub-feature to determine a primary component of the given sub-feature and a secondary component of the given sub-feature. Finally, the system analyzes the primary component of the given sub-feature and the secondary component of the given sub-feature.

In some embodiments of the present invention, the system recursively divides the sub-feature into smaller sub-features until the feature is recognized.

In some embodiments of the present invention, dividing the feature into two or more sub-features involves dividing the feature into quadrants.

In some embodiments of the present invention, identifying the feature involves at least one of: selecting the entire image; selecting a set portion of the image; selecting a portion of the image of a fixed size; selecting a set of connected components from the image; selecting a result of a parallax analysis of the image; and selecting a result of a motion flow analysis of the image.

In some embodiments of the present invention, performing the PCA operation on the feature involves using limited information from each pixel within the feature.

In some embodiments of the present invention, performing the PCA operation on the feature involves using all of the information from each pixel within the feature.

In some embodiments of the present invention, performing the PCA operation on the feature involves analyzing the feature according to a hue-saturation-value color model.

In some embodiments of the present invention, performing the PCA operation on the feature involves analyzing the feature according to a hue-saturation-intensity color model.

In some embodiments of the present invention, receiving the image involves receiving the image from one of: an image scanner, a still-image camera, and a video camera.

In some embodiments of the present invention, recognizing the feature further involves determining a character from a character library that the feature represents.

BRIEF DESCRIPTION OF THE FIGURES

FIGS. 3A-3D illustrate image features in accordance with an embodiment of the present invention.

DETAILED DESCRIPTION

Figure 1:
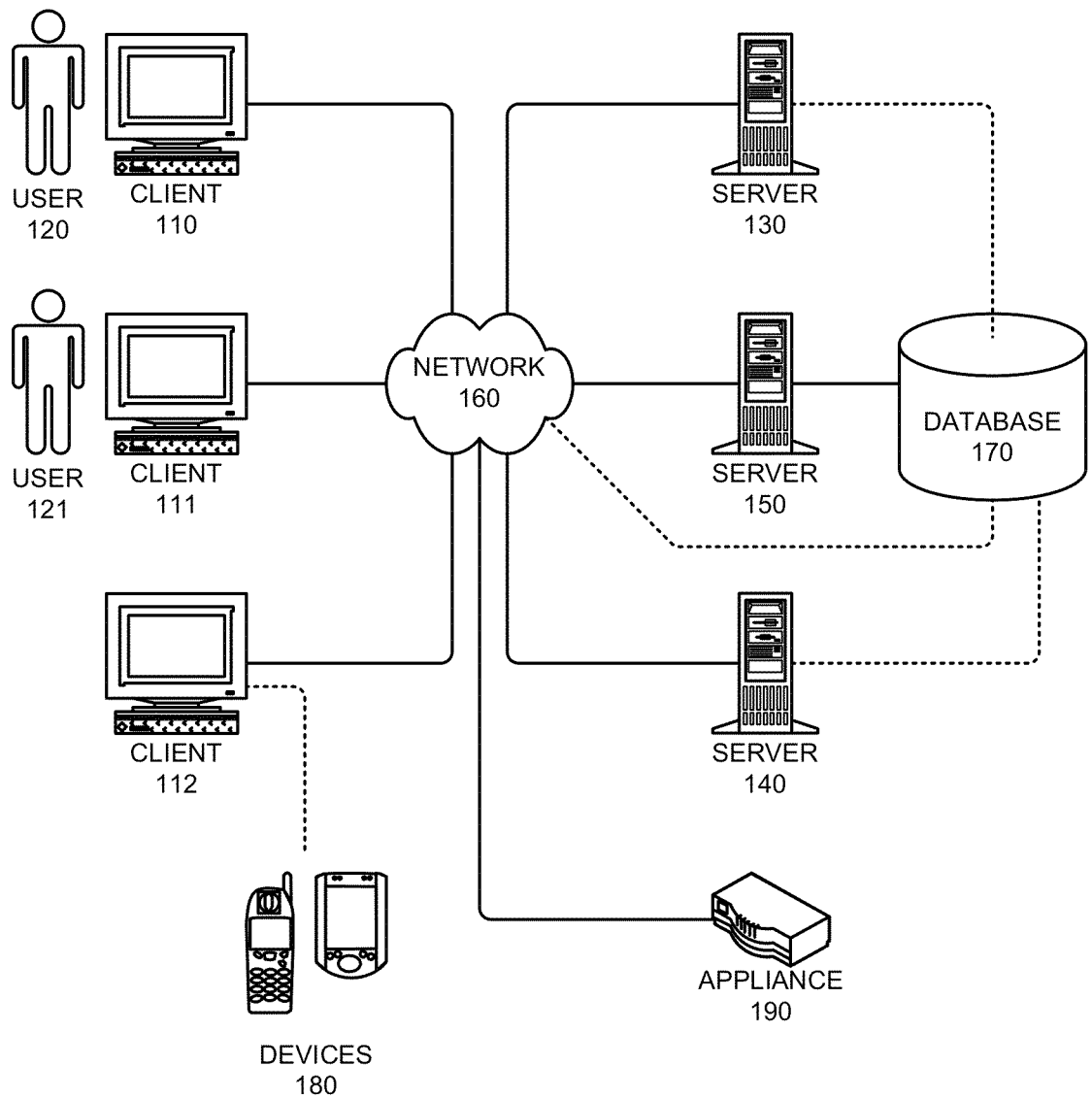
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for recognizing a feature of an image independently of the orientation or scale of the image. During operation, the system receives an image. Next, the system identifies a feature within the image. The system then performs a principal component analysis (PCA) operation on the feature to determine an orientation of a primary component of the feature and a secondary component of the feature, wherein the PCA operation is performed while source data for the image is retained. Next, the system normalizes the feature by rotating the feature with respect to the primary component of the feature to place the feature in a canonical form. Finally, the system recognizes the feature by analyzing the primary component of the normalized feature and the secondary component of the normalized feature.

Note that the step or normalizing the feature is not necessary in some embodiments. For example, if the image is received from a controlled source, such as a flatbed scanner, where the orientation of the feature is known, it may not be necessary to normalize the feature. In this example, the information in the primary component may help classify the feature rather than orient the feature.

Furthermore, note that while the description herein discusses using the primary and secondary components of the feature to recognize the feature, other components may also important to the classification process. For example, in some embodiments, if color information is available for each pixel in the feature, the system may use additional components related to the color information to recognize the feature. Additionally, in another embodiment of the present invention, if the image is from a video stream, the video stream may include additional components that are useful in recognizing the feature.

For example, once the PCA operation has been performed on the feature, in one embodiment of the present invention, the feature is rotated so that the primary component vector of the feature is pointing straight up. At this point an initial classification of the feature can be made based on the primary component vector and the secondary component vector. In one embodiment of the present invention wherein text is recognized, one PCA operation may be enough to recognize some characters. Note that, while the description herein refers to embodiments for recognizing text, embodiments of the present invention are not meant to be limited to text recognition. In some embodiments, virtually any type of object may be recognized.

By rotating the feature so that the primary component vector is pointing straight up, the initial orientation of the feature in the image does not matter. Also note that, by rotating individual features, the orientation of the entire image does not have to be determined as is necessary in many other image recognition systems. For example, the letter "A" that is in a normal reading orientation, and another letter "A" that is rotated 90 degrees clockwise will end up with the same PCA values after the characters have been rotated to a canonical form. Note that the canonical form does not have to result in the primary component vector being in a vertical position. What is important here is that the primary component vector is always pointing in the same direction. Any direction for the primary component vector may be chosen.

In some embodiments of the present invention, the system normalizes the feature by computing a bounding box around the feature and compressing the feature until the bounding box has a normalized width. In this way, the system can compensate for characters that are skewed in a three-dimensional space. For example, consider text written on a wall in a photograph wherein the wall is at an angle to the photographer. Text on the wall that is very close to the photographer may appear to be stretched or elongated, especially if it appears at the edge of the photograph.

In some embodiments of the present invention, the system normalizes the feature by computing a bounding box around the feature and expanding the feature until the bounding box has a normalized width.

As is the case above with skewed features that appear to be stretched out, the same is true for skewed features that appear to be compressed. In the same example above, text written on the wall that appears more central in the photograph and is farther away from the photographer may appear squeezed or compressed compared to normal characters. In this example, the character may be expanded to a normalized width to facilitate recognition.

Note that in some embodiments, other forms of normalization might be applied. For example, in one embodiment, the system may normalize the image by adjusting the scale of the image based on the primary component.

In some embodiments of the present invention, recognizing the feature further involves dividing the feature into two or more sub-features. Next, the system selects a given sub-feature from the two or more sub-features. The system then performs a PCA operation on the given sub-feature to determine a primary component of the given sub-feature and a secondary component of the given sub-feature. Finally, the system analyzes the primary component of the given sub-feature and the secondary component of the given sub-feature.

As described previously, the system completes an initial classification by performing the PCA operation on the feature. This results in an initial classification. Once this initial classification is complete, it may be necessary to further analyze some characters to recognize them. For example, consider the characters "M" and "W". For both of these characters (in most fonts), prior to rotation, the primary component vector is horizontal and the secondary component vector is vertical. Note that with PCA operations, the secondary component vector is always orthogonal to the primary component vector. In other words, after the initial PCA operation, the component vectors for the "M" and the "W" are similar enough that further analysis is required.

In some embodiments of the present invention, the system recursively divides the sub-feature into smaller sub-features until the feature is recognized. Note that until the feature is identified the system keeps breaking up the sub-features into smaller and smaller parts.

In some embodiments of the present invention, dividing the feature into two or more sub-features involves dividing the feature into quadrants. Note that any system for subdividing the feature may be used.

In some embodiments of the present invention, identifying the feature involves at least one of: selecting the entire image; selecting a set portion of the image; selecting a portion of the image of a fixed size; selecting a set of connected components from the image; selecting a result of a parallax analysis of the image; and selecting a result of a motion flow analysis of the image.

Note that virtually any process of identifying a feature can be used. In some embodiments of the present invention, the feature may even be selected by a user.

In some embodiments of the present invention, performing the PCA operation on the feature involves using limited information from each pixel within the feature. For example, in one embodiment, the PCA operation may only analyze intensity of each pixel, while in another embodiment the PCA operation may only analyze hue.

In some embodiments of the present invention, performing the PCA operation on the feature involves using all of the information from each pixel within the feature. For example, the PCA operation may analyze the color of each pixel during analysis.

In some embodiments of the present invention, performing the PCA operation on the feature involves analyzing the feature according to a hue-saturation-value color model, while in other embodiments of the present invention, performing the PCA operation on the feature involves analyzing the feature according to a hue-saturation-intensity color model. Note that any color model may be used with embodiments of the present invention for performing the PCA operation.

In some embodiments of the present invention, receiving the image involves receiving the image from one of: an image scanner, a still-image camera, and a video camera. Note that any source for receiving a digital image may be used.

In some embodiments of the present invention, recognizing the feature further involves determining a character from a character library that the feature represents. As discussed previously, embodiments of the present invention may be leveraged for OCR purposes.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
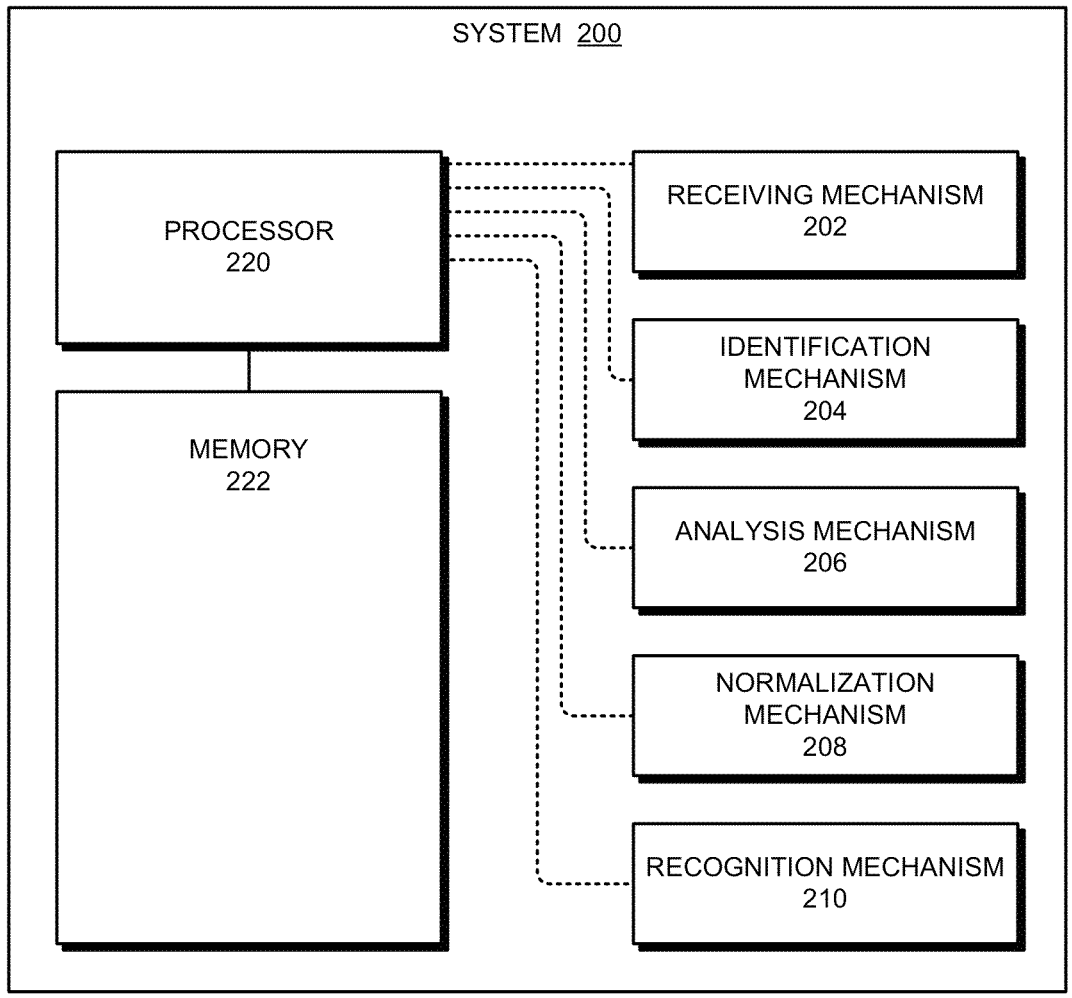
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, identification mechanism 204, analysis mechanism 206, normalization mechanism 208, recognition mechanism 210, processor 220, and memory 222.

Image Features

FIGS. 3A-3D illustrate image features in accordance with an embodiment of the present invention. Specifically, FIG. 3A illustrates an image feature that is a lowercase letter "b," while FIG. 3C illustrates an image feature that is an uppercase letter "F."

FIG. 3B illustrates the lowercase letter "b" from FIG. 3A after a PCA operation has been performed. As is illustrated, the primary component vector of the lowercase letter "b" is directed down and slightly to the right indicating the primary variability in the image feature. The secondary component vector, which is always orthogonal, is directed slightly up and to the right to indicate the secondary variability of the image feature.

Likewise, FIG. 3D illustrates the uppercase letter "F" from FIG. 3C after a PCA operation has been performed. As is illustrated, the primary component vector of the uppercase letter "F" is directed up and slightly to the right indicating the primary variability in the image feature. The secondary component vector is directed slightly down and to the right to indicate the secondary variability of the image feature.

Note that, if performing the PCA operation on these two features does not yield enough information to identify the characters, then the features are split into subcomponents and further PCA operations are performed on the subcomponents. This process is repeated recursively until the characters are identified.

As mentioned previously, in order to account for rotation and skew in the original image, in some embodiments of the present invention each feature is rotated after the PCA operation such that the primary component vector is pointing up to place each feature in a canonical form. Note that each feature does not actually have to be rotated, but any processing technique can process the feature as if it has been rotated. Also note that once the feature has been rotated to a canonical form, this rotation step is not repeated for subcomponents of the feature.

Recognizing a Feature

Figure 4:
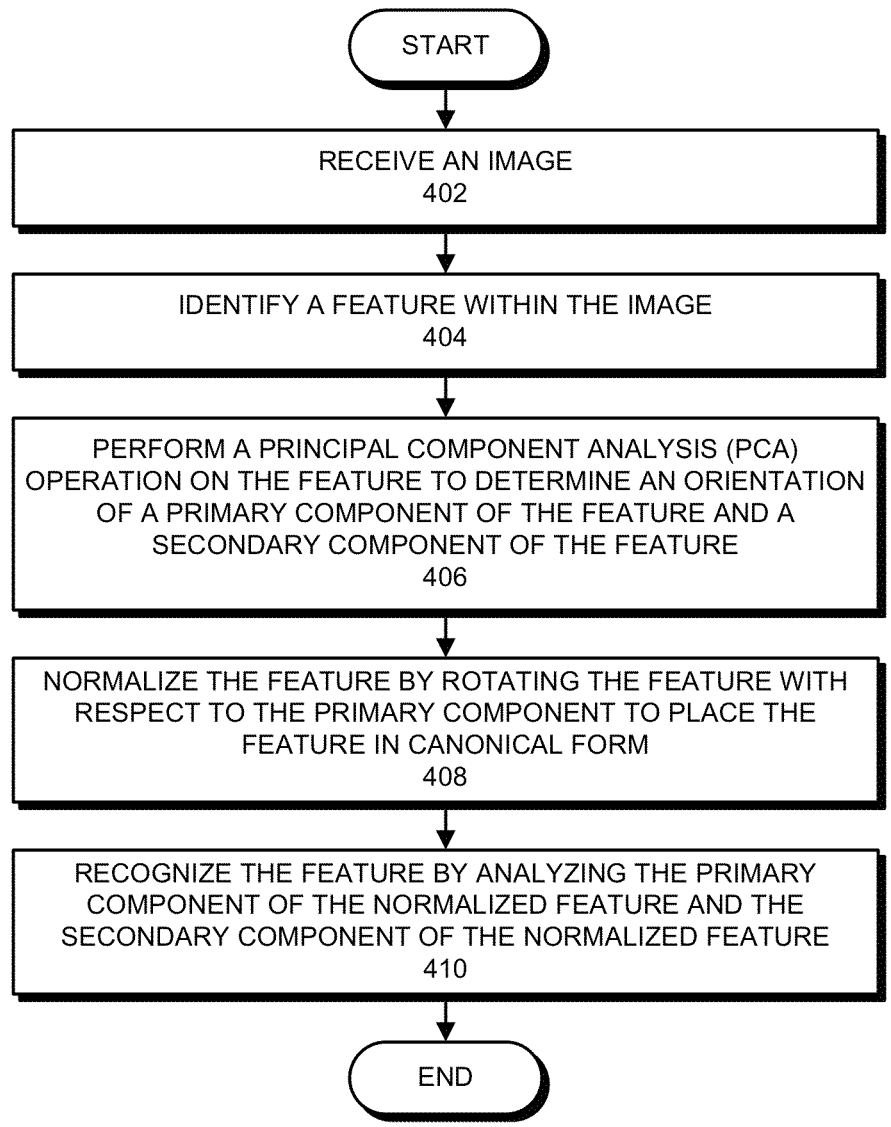
FIG. 4 presents a flow chart illustrating the process of recognizing a feature in accordance with an embodiment of the present invention.

FIG. 4 presents a flow chart illustrating the process of recognizing a feature in accordance with an embodiment of the present invention. During operation, receiving mechanism 202 receives an image (operation 402) from a source such as devices 180, appliance 190, or even user 120. Next, identification mechanism 204 identifies a feature within the image (operation 404). This feature can include anything from a character of text, to a person's face, to a barcode on a product. As described previously, identifying the feature involves at least one of: selecting the entire image; selecting a set portion of the image; selecting a portion of the image of a fixed size; selecting a set of connected components from the image; selecting a result of a parallax analysis of the image; and selecting a result of a motion flow analysis of the image.

Once a feature has been identified, analysis mechanism 206 performs a principal component analysis (PCA) operation on the feature to determine an orientation of a primary component of the feature and a secondary component of the feature (operation 406), wherein the PCA operation is performed while source data for the image is retained. Next, in some embodiments, normalization mechanism 208 normalizes the feature by rotating the feature with respect to the primary component of the feature to place the feature in a canonical form (operation 408). Note that as described previously, normalization may not be required in all embodiments. Finally, recognition mechanism 210 recognizes the feature by analyzing the primary component of the normalized feature and the secondary component of the normalized feature, as well as any other components found in the feature (operation 410). Note that it may be necessary to recursively break down the feature into subcomponents and perform PCA operations on the subcomponents until a recognition can be made. Also note that in some embodiments of the present invention the system maintains a library of PCA vector values for features and their subcomponents that facilitate recognizing the features.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for recognizing a feature of an image independently of the orientation or scale of the image, the method comprising:
    receiving an image;
    identifying a feature within the image;
    performing a principal component analysis (PCA) operation on the feature to determine an orientation of a primary component of the feature and a secondary component of the feature, wherein the PCA operation is performed while source data for the image is retained; and
    recognizing the feature by:
        dividing the feature into two or more sub-features,
        selecting a given sub-feature from the two or more sub-features,
        performing a PCA operation on the given sub-feature to determine a primary component of the given sub-feature and a secondary component of the given sub-feature,
        analyzing the primary component of the given sub-feature and the secondary component of the given sub-feature, and
        recursively dividing the sub-feature into smaller sub-features until the feature is recognized.

2. The computer-implemented method of claim 1, wherein prior to recognizing the feature, the method further comprises normalizing the feature by rotating the feature with respect to the primary component of the feature to place the feature in a canonical form.

3. The computer-implemented method of claim 2, wherein normalizing the feature further involves:
    computing a bounding box around the feature; and
    compressing the feature until the bounding box has a normalized width.

4. The computer-implemented method of claim 2, wherein normalizing the feature further involves:
    computing a bounding box around the feature; and
    expanding the feature until the bounding box has a normalized width.

5. The computer-implemented method of claim 1, wherein dividing the feature into two or more sub-features involves dividing the feature into quadrants.

6. The computer-implemented method of claim 1, wherein identifying the feature involves at least one of:
    selecting the entire image;
    selecting a set portion of the image;
    selecting a portion of the image of a fixed size;
    selecting a set of connected components from the image;
    selecting a result of a parallax analysis of the image; and
    selecting a result of a motion flow analysis of the image.

7. The computer-implemented method of claim 1, wherein performing the PCA operation on the feature involves using limited information from each pixel within the feature.

8. The computer-implemented method of claim 1, wherein performing the PCA operation on the feature involves using all of the information from each pixel within the feature.

9. The computer-implemented method of claim 8, wherein performing the PCA operation on the feature involves analyzing the feature according to a hue-saturation-value color model.

10. The computer-implemented method of claim 8, wherein performing the PCA operation on the feature involves analyzing the feature according to a hue-saturation-intensity color model.

11. The computer-implemented method of claim 1, wherein receiving the image involves receiving the image from one of:
- an image scanner;
- a still-image camera; and
- a video camera.

12. The computer-implemented method of claim 1, wherein recognizing the feature further involves determining a character from a character library that the feature represents.

13. A non-transitory computer-readable storage medium storing instructions that when executed by a computer cause the computer to perform a method for recognizing a feature of an image independently of the orientation or scale of the image, the method comprising:
- receiving an image;
- identifying a feature within the image;
- performing a principal component analysis (PCA) operation on the feature to determine an orientation of a primary component of the feature and a secondary component of the feature, wherein the PCA operation is performed while source data for the image is retained; and
- recognizing the feature by:
  - dividing the feature into two or more sub-features,
  - selecting a given sub-feature from the two or more sub-features,
  - performing a PCA operation on the given sub-feature to determine a primary component of the given sub-feature and a secondary component of the given sub-feature,
  - analyzing the primary component of the given sub-feature and the secondary component of the given sub-feature, and
  - recursively dividing the sub-feature into smaller sub-features until the feature is recognized.

14. The non-transitory computer-readable storage medium of claim 13, wherein prior to recognizing the feature, the method further comprises normalizing the feature by rotating the feature with respect to the primary component of the feature to place the feature in a canonical form.

15. The non-transitory computer-readable storage medium of claim 14, wherein normalizing the feature further involves:
- computing a bounding box around the feature; and
- compressing the feature until the bounding box has a normalized width.

16. The non-transitory computer-readable storage medium of claim 14, wherein normalizing the feature further involves:
- computing a bounding box around the feature; and
- expanding the feature until the bounding box has a normalized width.

17. The non-transitory computer-readable storage medium of claim 13, wherein dividing the feature into two or more sub-features involves dividing the feature into quadrants.

18. The non-transitory computer-readable storage medium of claim 13, wherein identifying the feature involves at least one of:
- selecting the entire image;
- selecting a set portion of the image;
- selecting a portion of the image of a fixed size;
- selecting a set of connected components from the image;
- selecting a result of a parallax analysis of the image; and
- selecting a result of a motion flow analysis of the image.

19. The non-transitory computer-readable storage medium of claim 13, wherein performing the PCA operation on the feature involves using limited information from each pixel within the feature.

20. The non-transitory computer-readable storage medium of claim 13, wherein performing the PCA operation on the feature involves using all of the information from each pixel within the feature.

21. An apparatus configured to recognize a feature of an image independently of the orientation or scale of the image, comprising:
- a memory;
- a processor;
- a receiving mechanism configured to receive an image;
- an identification mechanism configured to identify a feature within the image;
- an analysis mechanism configured to perform a principal component analysis (PCA) operation on the feature to determine an orientation of a primary component of the feature and a secondary component of the feature, wherein the PCA operation is performed while source data for the image is retained; and
- a recognition mechanism configured to recognize the feature by:
  - dividing the feature into two or more sub-features,
  - selecting a given sub-feature from the two or more sub-features,
  - performing a PCA operation on the given sub-feature to determine a primary component of the given sub-feature and a secondary component of the given sub-feature,
  - analyzing the primary component of the given sub-feature and the secondary component of the given sub-feature, and
  - recursively dividing the sub-feature into smaller sub-features until the feature is recognized.

22. A computer-implemented method for recognizing a feature of an image independently of the orientation or scale of the image, the method comprising:
- receiving an image;
- identifying a feature within the image;
- performing a principal component analysis (PCA) operation on the feature to determine an orientation of a primary component of the feature and a secondary component of the feature, wherein the PCA operation is performed while source data for the image is retained, wherein performing the PCA operation on the feature involves using all of the information from each pixel within the feature, and wherein performing the PCA operation on the feature involves analyzing the feature according to a color model; and
- recognizing the feature by analyzing the primary component of the feature and the secondary component of the feature.

23. The computer-implemented method of claim 22, wherein the color model can include one of:
- hue-saturation-value; and
- hue-saturation-intensity.

* * * * *